C. LE G. FORTESCUE.
ELECTRIC APPARATUS.
APPLICATION FILED APR. 12, 1916.
Reissued Oct. 10, 1916. 14,199.
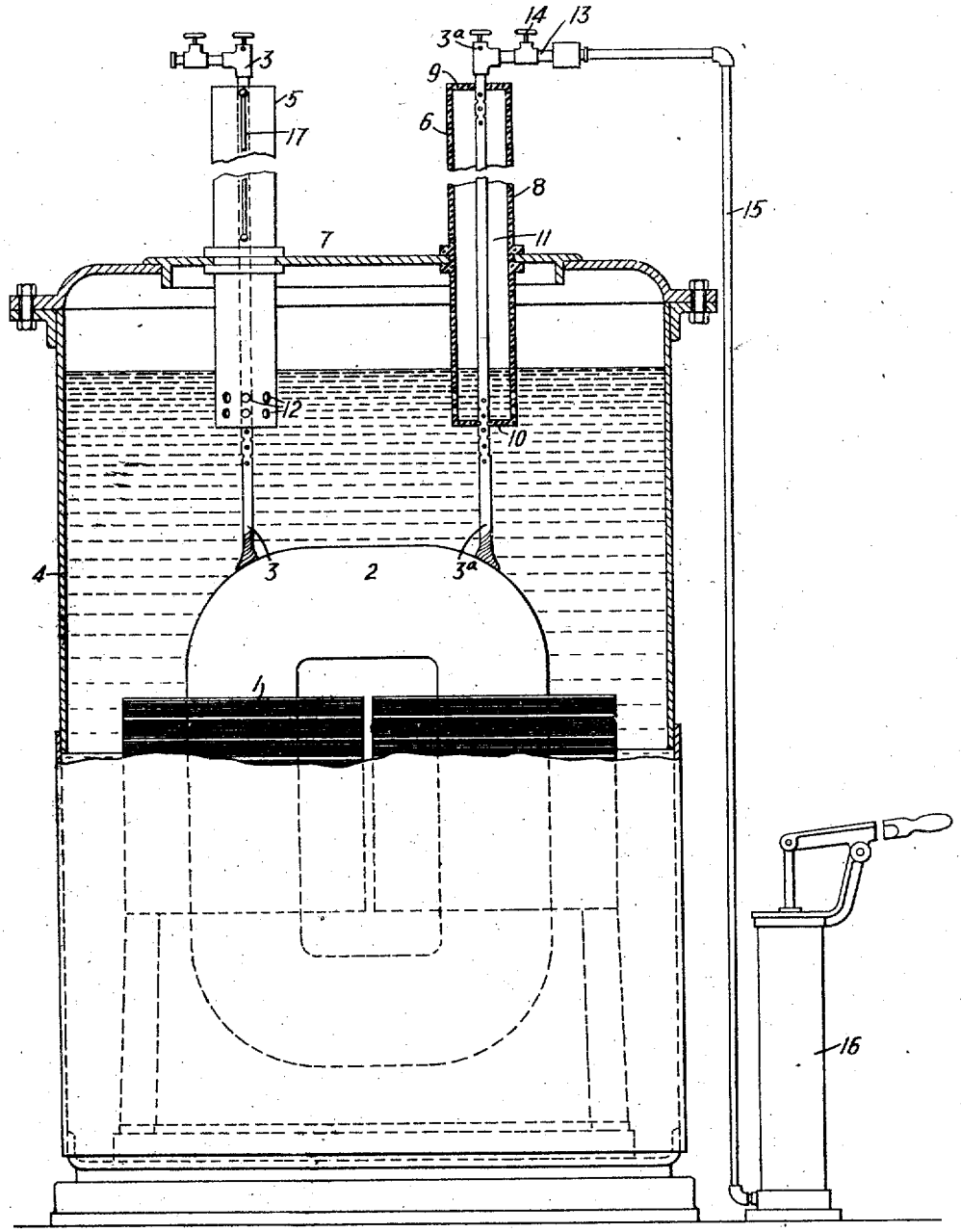
WITNESSES:
Fred. A. Lind.
Geo. W. Hansen.
INVENTOR
Charles LeG. Fortescue
BY
Wesley G. Carr
ATTORNEY

UNITED STATES PATENT OFFICE.

CHARLES LE G. FORTESCUE, OF WILKINSBURG, PENNSYLVANIA, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

ELECTRIC APPARATUS.

14,199. Specification of Reissued Letters Patent. Reissued Oct. 10, 1916.

Original No. 1,144,648, dated June 29, 1915, Serial No. 442,200, filed July 6, 1908. Application for reissue filed April 12, 1916. Serial No. 90,782.

*To all whom it may concern:*

Be it known that I, CHARLES LE G. FORTESCUE, a subject of the King of Great Britain, and a resident of Wilkinsburg, in the county of Allegheny and State of Pennsylvania, have invented a new and useful Improvement in Electric Apparatus, of which the following is a specification.

My invention relates to insulators and insulating bushings which are adapted for supporting and separating the conducting leads of transformers and other electric devices from the casings in which they are contained.

The object of my invention is to provide an improved device of the class above indicated that shall be relatively compact and particularly adapted for use with very high voltage conductors.

Various electrical devices, of which high-voltage transformers are well known examples, are immersed in oil or other insulating fluid contained in casings or tanks constructed of conducting material. The insulating sleeves or bushings through which the high-voltage leads are threaded are, as ordinarily constructed, very large and heavy and liable to injury in transportation.

According to my present invention, I provide a hollow sleeve or bushing which may preferably have the general form of a tube and be carefully sealed at its upper extremity and supported at an intermediate point by the cover plate of the transformer tank or casing through which it extends, the lower end being perforated and submerged in the oil or other insulating fluid contained in the transformer tank. The hollow bushing is empty while it is being transported or assembled but during the operation of the device with which it is associated the air is exhausted from the upper end of the sealed bushing and, since the lower end is submerged in the oil, the atmospheric pressure in the tank will force oil into the bushing and thereby materially improve its insulating properties.

The single figure of the accompanying drawing is a partially sectional elevation of a transformer equipped with insulating bushings constructed in accordance with my invention.

Referring to the drawing, the device here illustrated comprises a transformer having a core member 1, a winding 2, and conducting leads 3 and $3^a$, a casing or tank 4 containing oil or other suitable insulating fluid in which the transformer is immersed and a plurality of insulating bushings 5 and 6 surrounding the leads and extending through and supported by a cover 7 of the tank.

Each of the bushings comprises a sleeve or tube, 8, having heads 9 and 10 which are carefully sealed into the ends of the tube and complete the inclosing walls of a chamber 11 formed between the leads $3^a$, and the tube. The upper end of the chamber 11 must be air tight but the lower end extends below the liquid level of the oil in the transformer tank and is provided with perforations 12. A pipe connection 13 is tapped into the upper end of the lead $3^a$ which is hollow and provided with fluid-inlet and outlet openings $3^b$, and the end of the tap is adapted to receive a tube or pipe 15, which is connected to an exhaust pump 16, whenever it is desired to fill the bushing with oil. An oil gage 17 may be provided to indicate the level of the oil, above the cover of the tank.

My bushing is of special advantage for use in high-voltage testing transformers where the service is intermittent, the voltage being very high and the transformer frequently under the care of an attendant.

After the oil level in the bushing has been raised to the desired height by exhausting the air from the top of the chamber 11, a valve 14 in the top 13 may be closed and the pipe 15 removed, the oil level being maintained constant, except for slight variations due to leakage, until the valve is again opened.

It will be readily understood that my improved insulating bushing is not restricted in its use to transformer leads and that it may be employed for various purposes within the scope of my invention.

I claim as my invention:—

1. The combination with a container and a body of liquid disposed therein, of an insulating bushing for electrical apparatus projecting both upwardly and downwardly through an aperture in the container and comprising a casing having a perforated lower end which is immersed in the liquid, and an air valve adapted to coöperate with air-exhausting apparatus in order to remove the air contained within the said casing.

2. The combination with a container and an insulating liquid disposed therein, of an insulating bushing projecting through an aperture in the container and comprising a hollow casing the lower end of which is perforated and adapted to project into the insulating liquid, and a valve adapted to coöperate with exhausting apparatus to remove the air contained within the casing and thereby effect displacement of the air in said casing by a portion of said insulating liquid.

3. The combination with a fluid-containing tank provided with an opening and adapted to receive an electrical apparatus, of an insulating bushing therefor comprising a hollow casing which projects both upwardly and downwardly through said opening, the upper end of the casing being sealed and the lower end being adapted to project into a body of liquid contained in said tank and being provided with at least one opening to permit ingress and egress of the liquid.

4. The combination with a fluid-containing tank provided with a hollow insulating extension through which an electric conducting lead extends, the outer end of said extension being sealed and the inner end being open and immersed in the fluid in said tank, of means for exhausting air from said extension whereby the level of the fluid contained therein may be raised above that of the fluid in the containing tank.

5. In an electric apparatus, the combination with a casing and a liquid therein, of a hollow insulating bushing for a conducting lead sealed at one end and immersed in the liquid at the other end, and a valve adapted to coöperate with air-exhausting apparatus in order that the air in said bushing may be displaced by a portion of the liquid in said casing.

6. The combination with a tank containing a body of insulating liquid, of an electrical apparatus, immersed in said liquid and having terminal conductors, insulating tubes for said terminal conductors that project through apertures formed in the tank and into said liquid and have openings beneath the surface thereof, and means for permitting egress of the air from said tubes in order that it may be replaced by said liquid when the apparatus is in use.

7. In an electrical apparatus, the combination with a containing tank and a fluid disposed therein, of a hollow insulating bushing through which a conducting lead extends, said bushing being sealed at one end and open at the other, the open end being immersed in said fluid, and an air valve to permit egress of the air contained in said bushing.

8. The combination with a container provided with an aperture, of an insulating bushing comprising a hollow casing which is seated in said aperture and projects both inwardly and outwardly therefrom, said casing having a sealed outer end and a perforated inner end, a body of insulating liquid in which the perforated end of said casing is submerged, and means for withdrawing air from the outer end of said casing.

9. The combination with an oil-filled tank, of a hollow oil-filled insulator for the passage of a conductor thereinto extending through its upper wall down below the level of the oil, said insulator being open at its lower end so that the oil in the tank has access to its interior.

10. The combination with an oil-filled tank open to the atmosphere, of an air-tight hollow oil-filled insulator for the passage of a conductor into said tank extending through its upper wall down below the level of the oil, said insulator being open at the lower end so that the oil in the tank has access to its interior.

11. The combination with a containing casing adapted to contain a body of insulating liquid filling said casing to a certain level, of a hollow insulator for the passage of an electric conductor thereinto extending through the casing wall, said insulator being open at its lower end which is positioned to extend below the level of the liquid in said casing so that the interior of the insulator may contain a body of liquid in common with the body of liquid in the containing casing.

In testimony whereof, I have hereunto subscribed my name this 31st day of March, 1916.

CHARLES LE G. FORTESCUE.